(12) United States Patent
Phillips et al.

(10) Patent No.: US 6,763,015 B1
(45) Date of Patent: Jul. 13, 2004

(54) COMMUNICATION DEVICES, METHODS, AND COMPUTER PROGRAM PRODUCTS FOR ESTABLISHING CONCURRENT CALLS ON A SINGLE TDMA CARRIER FREQUENCY

(75) Inventors: John C. Phillips, New Hill, NC (US); James C. Peele, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/481,354

(22) Filed: Jan. 12, 2000

(51) Int. Cl.[7] .............................................. H04B 7/212
(52) U.S. Cl. ...................... 370/347; 370/282; 370/336; 370/353
(58) Field of Search ................................ 370/321, 326, 370/337, 347, 282, 442, 353, 354, 522, 314, 329, 336, 338, 352, 359, 360, 389, 392, 419, 420, 437, 458

(56) References Cited

U.S. PATENT DOCUMENTS

| 5,621,800 | A | * | 4/1997 | Weng et al. ................. 380/266 |
| 6,236,855 | B1 | * | 5/2001 | Austin ......................... 455/423 |
| 6,295,302 | B1 | * | 9/2001 | Hellwig et al. ............. 370/522 |
| 6,295,453 | B1 | * | 9/2001 | Desgagne et al. ......... 370/343 |
| 6,411,613 | B1 | * | 6/2002 | Seymour et al. ............ 370/347 |
| 6,574,202 | B1 | * | 6/2003 | Himayat et al. ............ 370/329 |

FOREIGN PATENT DOCUMENTS

| WO | WO 98/06225 | 7/1997 |
| WO | WO 99/53704 | 4/1999 |

OTHER PUBLICATIONS

International Search Report, PCT/US/00/41498, Oct. 24, 2000.
"Slot Formats for Multi-Rate Async Data Service," TR–45.3 97:01.1410, Digital Public Mobile and Personal Communications, Four Seasons Hotel, Newport Beach, CA, Jan. 14–16, 1997 (3 pages).
"Slot Formats when Operating in Multi Slot Mode," TR–45.3 97:01.1411, Digital Public Mobile and Personal Communications, Four Seasons Hotel, Newport Beach, CA, Jan. 14, 1997 (16 pages).
"FACCH/SACCH Signaling Channels when Operating in Multi Slot Mode," TR–45.3 97:01.1412, Digital Public Mobile and Personal Communications, Four Seasons Hotel, Newport Beach, CA, Jan. 14–16, 1997 (2 paes).
"Proposed MAHO measurement procedure while operating in multi slot mode," TR–45.3 97:01.1413, Digital Public Mobile and Personal Communications, Four Seasons Hotel, Newport Beach, CA, Jan. 14–16, 1997 (3 pages).
"STI Association for ISM–136 Multimedia Control," TR–45.3.6/97:01.14, Digital Public Mobile and Personal Communications, Four Seasons Hotel, Newport Beach, CA, Jan. 18, 1997 (4 pages).

* cited by examiner

*Primary Examiner*—Phirin Sam
(74) *Attorney, Agent, or Firm*—Myers Bigel Sibley & Sajovec, P.A.

(57) ABSTRACT

Communication devices, methods, and computer program products acquire a first time division multiple access (TDMA) time slot on a TDMA carrier frequency to establish a first call and acquire a second TDMA time slot on the TDMA carrier frequency to establish a second call. The first and second time slots are associated with a single TDMA frame, which may allow, for example, a voice call and a data call to be established concurrently. Accordingly, the need for multiple phones to maintain both a voice connection and an Internet connection concurrently on a TDMA network may be obviated. Inasmuch as the two time slots are on the same TDMA carrier frequency, additional frequency synthesizers or tuning of existing frequency synthesizers may not be required.

3 Claims, 5 Drawing Sheets

COMMUNICATION DEVICES, METHODS, AND COMPUTER PROGRAM PRODUCTS FOR ESTABLISHING CONCURRENT CALLS ON A SINGLE TDMA CARRIER FREQUENCY

BACKGROUND OF THE INVENTION

The present invention relates generally to the field of communication, and, more particularly, to communication using time division multiple access (TDMA) technology.

Figure 1:
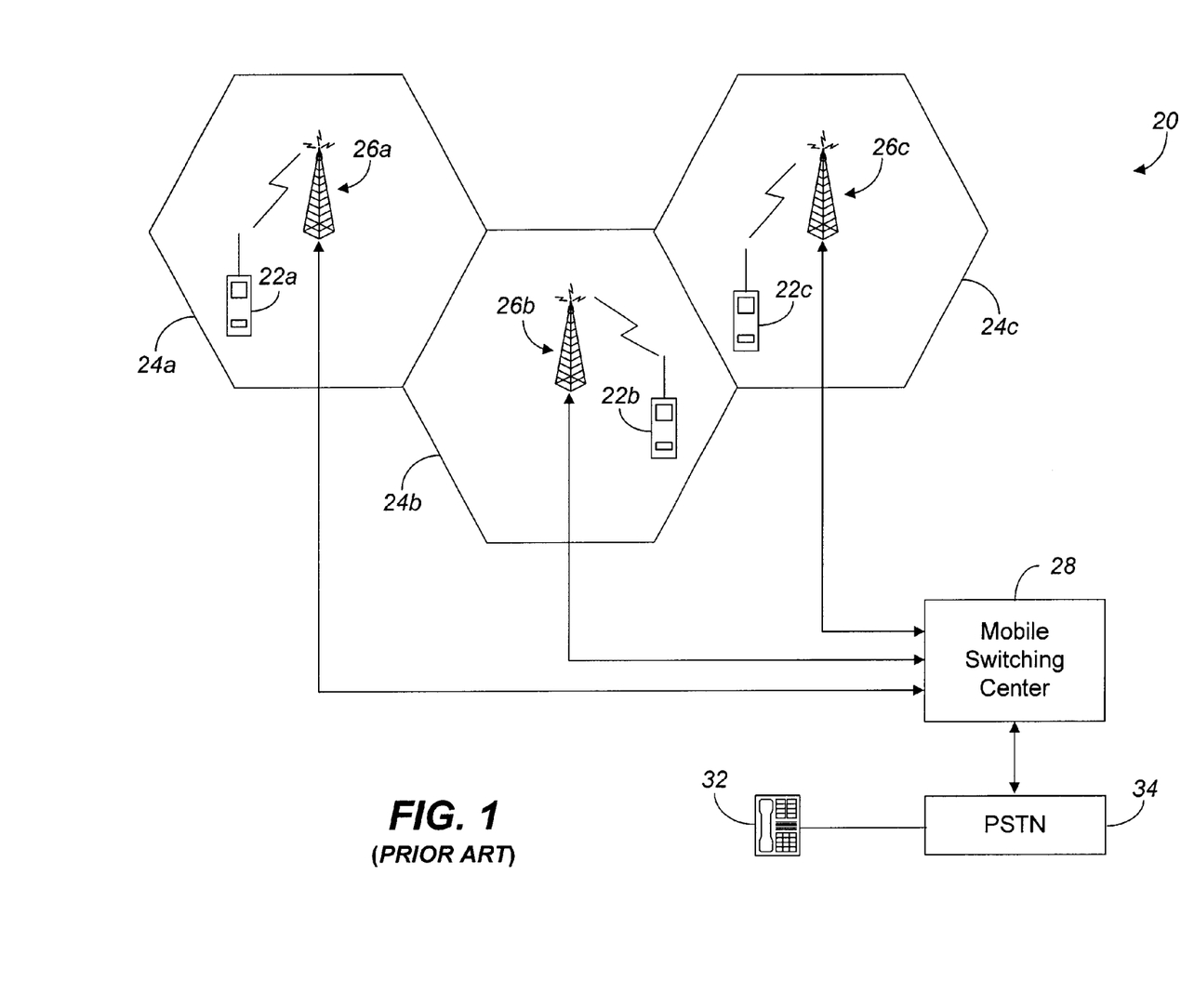
FIG. 1 is a diagram that illustrates a conventional terrestrial cellular network.

Wireless communication systems are commonly used to provide voice and data communication services to subscribers. A typical terrestrial cellular radiotelephone communication system 20 is illustrated in FIG. 1. The cellular radiotelephone system 20 may include one or more radiotelephones or mobile terminals 22a,b,c, that communicate via a plurality of cells 24a,b,c served by base stations 26a,b,c and a mobile switching center (MSC) 28. Although only three cells 24a,b,c are shown, a typical cellular network may include hundreds of cells, multiple MSCs 28, and may serve thousands of radiotelephones 22a,b,c.

The cells 24a,b,c generally serve as nodes in the communication system 20 from which links are established between the radiotelephones 22a,b,c and the MSC 28 by way of the base stations 26a,b,c serving the cells 24a,b,c. Each cell 24a,b,c will typically have allocated to it one or more dedicated control channels and one or more traffic channels. A control channel is a dedicated channel used for transmitting cell identification and paging information. A traffic channel carries the voice and data information. Through the cellular network 20, a duplex radio communication link may be established between two radiotelephones 22 or between a radiotelephone 22 and a wireline telephone user 32 through the public switched telephone network (PSTN) 34. A function of the base stations 26a,b,c is to handle radio communication between the cells 24a,b,c and the radiotelephones 22a,b,c. In this capacity, the base stations 26a,b,c may function as a relay station for data and voice signals.

The radiotelephones 22a,b,c may be designed to communicate using, for example, frequency division multiple access (FDMA) technology (e.g., the advanced mobile phone service (AMPS) standard); time division multiple access (TDMA) technology (e.g., the Telecommunication Industry Association (TIA)/Electronic Industries Association (EIA) 136 or digital AMPS (DAMPS) standard or the global system for mobile communication (GSM) standard); or code division multiple access (CDMA) technology (e.g., the TIA interim standard (IS) 95). The FDMA and TDMA technologies will be discussed in more detail hereafter.

Traditional analog cellular systems generally use FDMA to create communication channels. Radiotelephone communication signals are generally modulated waveforms that are communicated over predetermined frequency bands in a spectrum of carrier frequencies. In a typical FDMA system, each of these discrete frequency bands may serve as a channel over which cellular radiotelephones communicate with a base station or satellite serving a cell.

As the number of subscribers in a cellular radiotelephone system increases, the available frequency spectrum may need to be managed with greater efficiency to provide more channels while maintaining communication quality. This challenge may be further complicated because subscribers may not be uniformly distributed among cells in the system. More channels may be needed for particular cells to handle potentially higher local subscriber densities at any given time. For example, a cell in an urban area might contain hundreds or thousands of subscribers at certain times, which may exhaust the number of channels available in the cell.

To provide service to increasing numbers of subscribers, conventional cellular systems may implement frequency reuse to increase channel capacity in each cell and increase spectral efficiency. More specifically, frequency bands may be allocated to each cell such that cells using the same frequencies are geographically separated to allow radiotelephones in different cells to use the same frequency simultaneously without interfering with each other. Accordingly, many thousands of subscribers may be served by a system having only several hundred allocated frequency bands.

Another technology that may further increase channel capacity and spectral efficiency is TDMA. A TDMA system may be implemented by subdividing the frequency bands used in conventional FDMA systems into sequential time slots. Communication over a frequency band typically occurs via a repetitive TDMA frame structure wherein each frame includes a plurality of time slots. Each radiotelephone communicates with the base station using bursts of digital data transmitted during the radiotelephone's assigned time slots.

A channel in a TDMA system may include at least one time slot on at least one frequency band, and typically includes at least one time slot in each of a plurality of frames. As discussed in the foregoing, channels may be used to communicate voice, data, or other information between users, e.g., between a radiotelephone and a wireline telephone. Predetermined time slots of predetermined frequency bands may be allocated for dedicated control channels. These dedicated control channels may include forward control channels, which are used to broadcast control information in a cell of the radiotelephone system to radiotelephones which may seek to access the system. The control information broadcast on a forward control channel may include such information as the cell's identification, associated network identification, system timing information, and other information needed to access the radiotelephone system from a radiotelephone.

Traditional radiotelephones or mobile terminals may include a serial data port in which a device, such as a computer or personal digital assistant (PDA), may be connected to establish a wireless data connection. Moreover, a cellular network may include such communication devices known as "wireless communicators," which are being used in ever increasing numbers for voice calls, data calls, facsimile transfer, Internet access, paging, and other personal organization features such as calendar management or even travel directions via the Global Positioning System (GPS). As used herein, the term "wireless communicator" may include a cellular radiotelephone with a multi-line display, a Personal Communications System (PCS) terminal that may combine a cellular radiotelephone with data processing, facsimile and data communications capabilities, a PDA that can include a radiotelephone, pager, Internet/intranet access, Web browser, organizer, calendar and/or a GPS receiver, and conventional laptop and/or palmtop receivers that include radiotelephone transceivers. Wireless communicators also may be referred to as "pervasive computing" devices.

In view of the capabilities of wireless communicators, radiotelephones, PDA devices, and the like, there exists a need for improved communication devices that can provide voice and data services.

SUMMARY OF THE INVENTION

Communication devices, methods, and computer program products may acquire a first time division multiple access (TDMA) time slot on a TDMA carrier frequency to establish a first call and acquire a second TDMA time slot on the TDMA carrier frequency to establish a second call. The first and second time slots may be associated with a single TDMA frame of the TDMA carrier frequency, which may allow, for example, a voice call and a data call to be established concurrently. Accordingly, the need for multiple phones to maintain both a voice connection and an Internet connection concurrently on a TDMA network may be obviated. As a result, a user need not carry two separate phones having separate phone numbers and electronic serial numbers and the additional weight and bulk of multiple batteries and battery chargers.

In accordance with an aspect of the invention, a communication device may include a controller that configures a transmit switch to selectively connect a voice source and a data source to a transmit interface based on the TDMA time slots allocated to respective voice and data calls. Similarly, the controller configures a receive switch to selectively connect a voice destination and a data destination to a receive interface based on the TDMA times slots allocated to the respective voice and data calls.

In accordance with another aspect of the invention, the first and second TDMA time slots used to establish the first and second calls may each comprise a full rate TDMA time slot. In accordance with yet another aspect of the invention, a communication device may acquire all time slots on the TDMA carrier frequency when establishing concurrent calls. In accordance with still another aspect of the invention, a base station may send a signal to a communication device that indicates whether one or more of the time slots are available on the TDMA carrier frequency.

The present invention, therefore, may allow a communication device to make concurrent voice and data calls on the same TDMA carrier frequency by allocating one full rate time slot on the carrier frequency to the voice call and one full rate time slot on the carrier frequency to the data call. Inasmuch as the two full rate time slots are on the same TDMA carrier frequency, additional frequency synthesizers or tuning of existing frequency synthesizers may not be required.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as a communication device/system, method, or computer program product. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable or computer-readable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
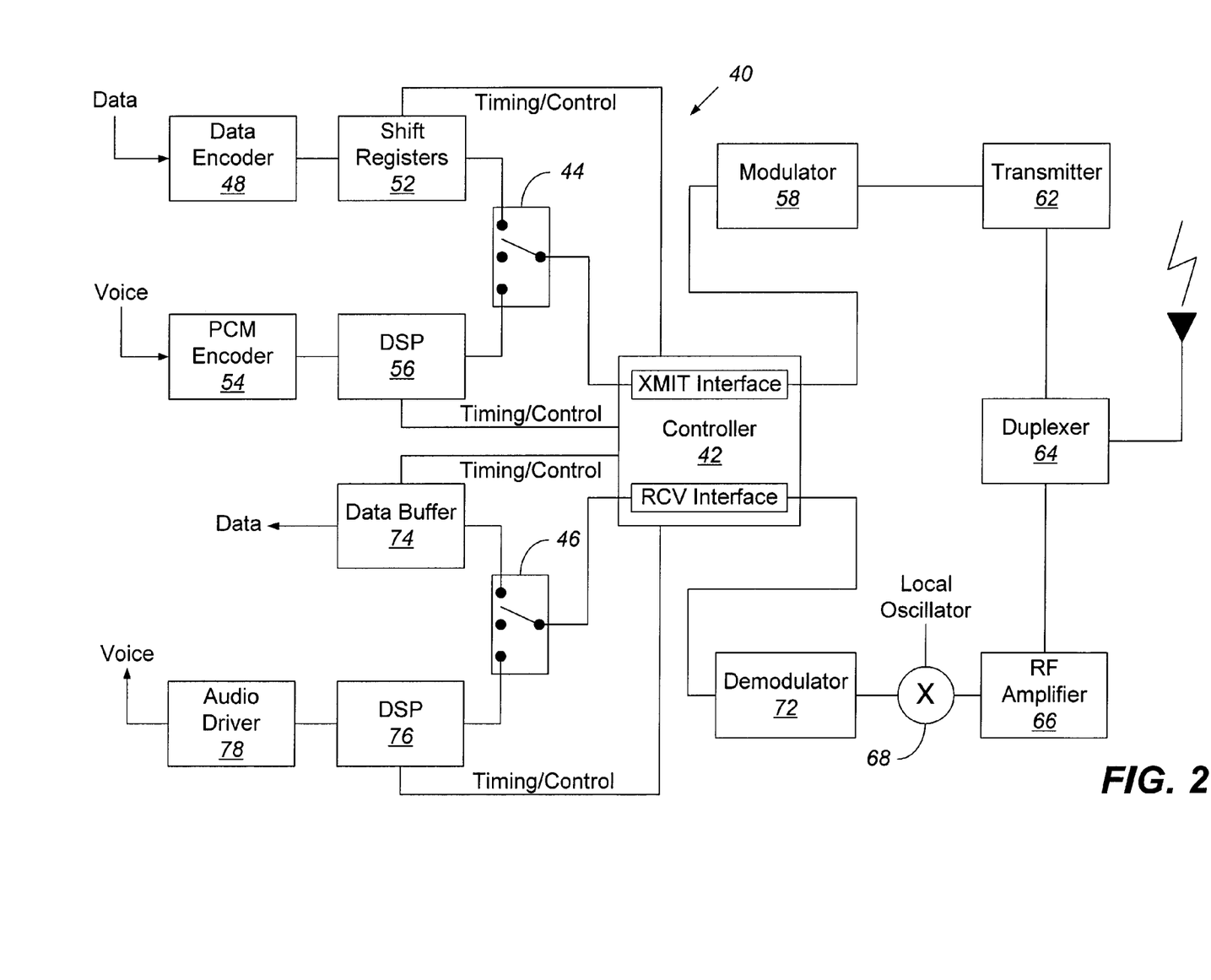
FIG. 2 is a block diagram that illustrates an exemplary communication device that may establish concurrent calls on a single TDMA carrier frequency in accordance with the present invention.

With reference to FIG. 2, a communication device 40 that may establish concurrent calls on a time division multiple access (TDMA) carrier frequency will be described hereafter. It should be understood that the communication device 40 is exemplary of communication devices having both a voice and a data communication capability. Such devices may include, but are not limited to, wireless communicators as discussed hereinabove and traditional radiotelephones or mobile terminals having a data port in which a data processing device, such as a computer or PDA device, may be connected. Moreover, data communication may include the transfer of textual, audio, and/or video information.

The communication device 40 includes a controller 42 having a transmit (XMIT) interface and a receive (RCV) interface. The transmit interface may be connected to either a data source or a voice source via a transmit switch 44. More specifically, the controller 42 may configure the transmit switch 44 in a first position to connect the transmit interface to the voice source, in a second position to connect the transmit interface to the data source, or in a third position to disconnect the transmit interface from both the voice and data sources. Similarly, the receive interface may be connected to either a data destination or a voice destination via a receive switch 46. The controller 42 may configure the receive switch 46 in a first position to connect the receive interface to the voice destination, in a second position to connect the receive interface to the data destination, or in a third position to disconnect the receive interface from both the voice and data destinations.

The data source provides information to the controller 42 through the transmit switch 44 via a data encoder 48 and one or more shift registers 52. The data encoder 48 formats the data generated, for example, by an application running on the communication device 40 or, alternatively, by another device (e.g., a computer or PDA device) connected to the communication device 40, into a form compatible with the circuitry of the communication device 40. The data formatting procedure may include level shifting or conversion of information bearing signals into digital data. For example, a computer or PDA device may be connected to the communication device 40 via an infrared input/output (I/O) port. The data encoder 48 may be used to encode the infrared signals into digital data. Alternatively, a computer or PDA port may be connected to the communication device 40, for example, via a wired port, an optical fiber port, a radio frequency (RF) port, etc. Once the data encoder 48 has encoded the information from the data source, the digital data is supplied to one or more shift registers 52, which arrange the digital data into a serial configuration for transmission.

The voice source provides information to the controller 42 through the transmit switch 44 via a pulse code modulation (PCM) encoder 54 and a digital signal processor (DSP) 56. The PCM encoder 54 takes samples of an analog voice signal and encodes them into 8-bit PCM samples. The DSP 56 further encodes the PCM samples to reduce the bandwidth of the transmitted voice signal.

The controller 42 configures the position of the transmit switch 44 to selectively connect the shift registers 52 or the DSP 56 to the modulator 58 based on the TDMA time slot. Digital information may be coupled from either the shift registers 52 or the DSP 56 to the modulator 58 using timing and control signals from the controller 42. The modulator 58 uses the digital information to modulate a carrier frequency preferably using $\pi/4$ differential quadrature phase shift keying (DQPSK), which is a standard modulation technique for terrestrial TDMA systems. The modulated carrier signal is provided to a transmitter 62, which amplifies the modulated carrier signal according to the relevant transmission standard. A duplexer 64 receives a transmission signal from the transmitter 62 and outputs the transmission signal via an antenna.

The duplexer 64 also receives a modulated signal via the antenna. This TDMA signal is provided to a radio frequency (RF) amplifier 66, which increases the signal power. A mixer 68 is used to multiply the received TDMA signal by a signal generated by a local oscillator. The mixer 68 generates a signal corresponding to the difference between the TDMA signal and the local oscillator signal. This difference signal is provided to a demodulator 72, which recovers digital information from the difference signal and provides this information to the controller 42.

The controller 42 configures the position of the receive switch 44 to selectively connect the demodulator 72 to either a data buffer 74 or a DSP 76 based on the TDMA time slot. Digital information may be coupled from the demodulator 72 to either the data buffer 74 or the DSP 76 using timing and control signals from the controller 42. The data buffer 74 may be used to collect and arrange the digital data before it is delivered to the data destination. The communication device 40 may optionally include additional components to process or format the digital data in the data buffer 74 before providing the digital data to the data destination.

The DSP 76 decodes the PCM voice samples from the demodulator 72 by implementing an inverse operation of the encoding performed by the DSP 56. The PCM samples output from the DSP 76 are provided to an audio driver 78, which converts the digital PCM voice samples into an analog audio signal. The analog audio signal is then provided to the voice destination.

Figure 3:
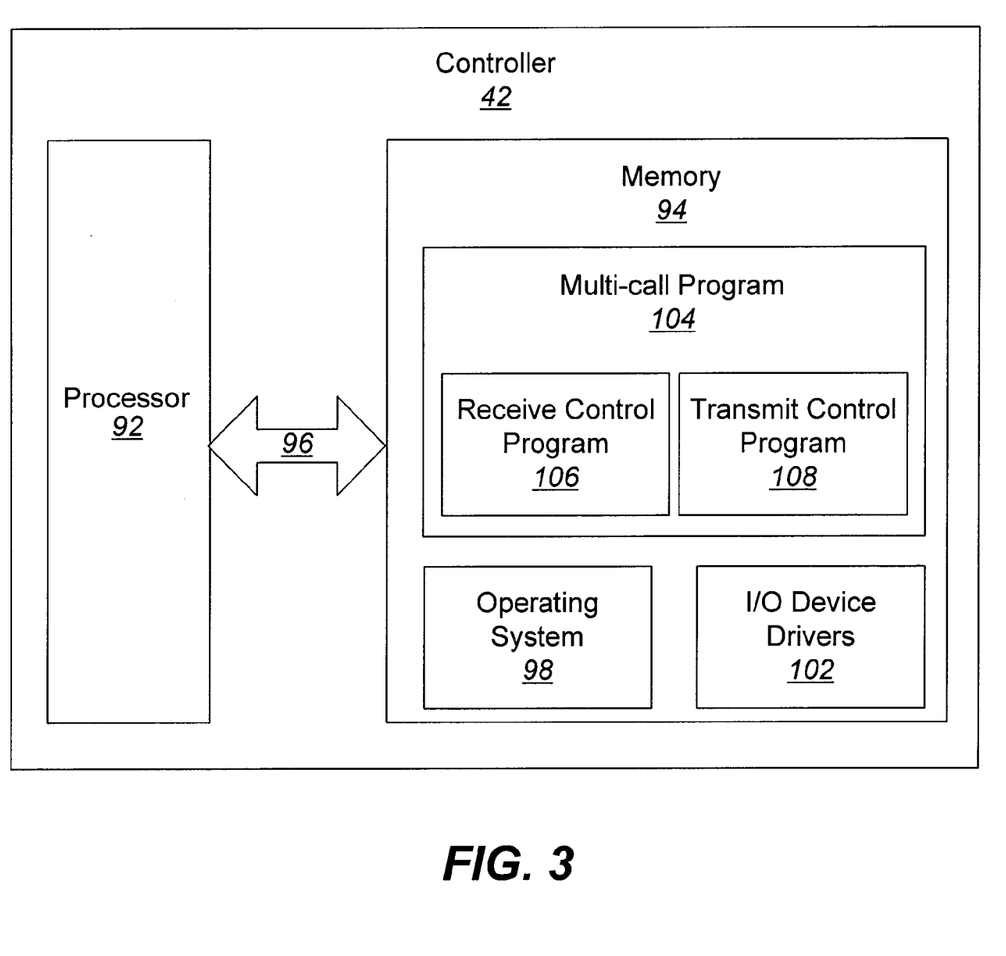
FIG. 3 is a block diagram that illustrates a controller shown in FIG. 2 in greater detail.

FIG. 3 illustrates the controller 42 in more detail. The controller 42 includes a processor 92 that communicates with a memory 94 via an address/data bus 96. The processor 92 may be any commercially available or custom microprocessor suitable for an embedded application. The memory 94 is representative of the overall hierarchy of memory devices containing the software and data used to implement the functionality of the communication device 40. The memory 94 may include, but is not limited to, the following types of devices: cache, ROM, PROM, EPROM, EEPROM, flash, SRAM, and DRAM.

As shown in FIG. 3, the memory 94 may hold an operating system module 98, an input/output (I/O) device drivers module 102, and a multi-call program module 104. The operating system 98 should be designed for real time embedded applications and, preferably, is relatively compact to make efficient use of the memory 94. The I/O device drivers 102 typically include software routines accessed through the operating system 98 to communicate with devices such as a keyboard/keypad, a display, a speaker, a microphone, certain memory components and I/O ports for external devices.

The multi-call program module 104 comprises programs for establishing concurrent calls on a single TDMA carrier frequency. In particular, the multi-call program module 104 includes a receive control program module 106 and a transmit control program module 108 for controlling the operations of the receive switch 46 and the transmit switch 44, respectively, on a TDMA time slot basis.

Computer program code for carrying out operations of the multi-call program module 104 is preferably written in a high-level programming language, such as C, Java, Smalltalk, or C++ for development convenience. Nevertheless, some code segments may be written in assembly or machine language to optimize speed, memory usage, or layout of the software in memory.

The present invention is described hereinafter with reference to flowchart and/or block diagram illustrations of communication devices, methods, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
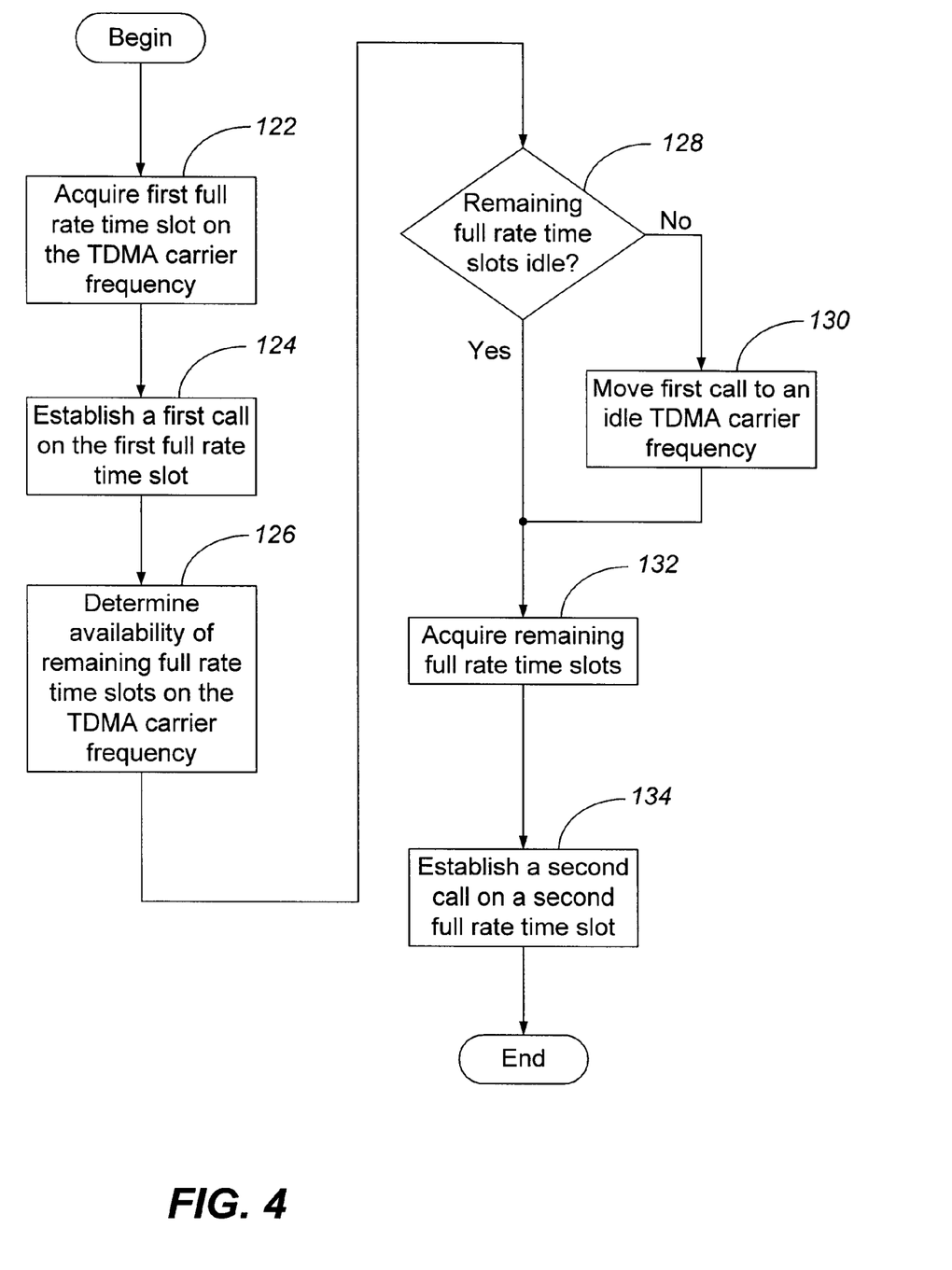
FIG. 4 is a flowchart that illustrates operations of a communication device of FIG. 2 in accordance with the present invention.

With reference to the flowchart of FIG. 4, exemplary operations of the communication device 40 for establishing concurrent calls on a single TDMA carrier frequency begin at block 122 where the controller 42 acquires a full rate time slot on the TDMA carrier frequency. A review of the time slot organization of a TDMA system will be briefly discussed with reference to FIG. 5.

Figure 5:
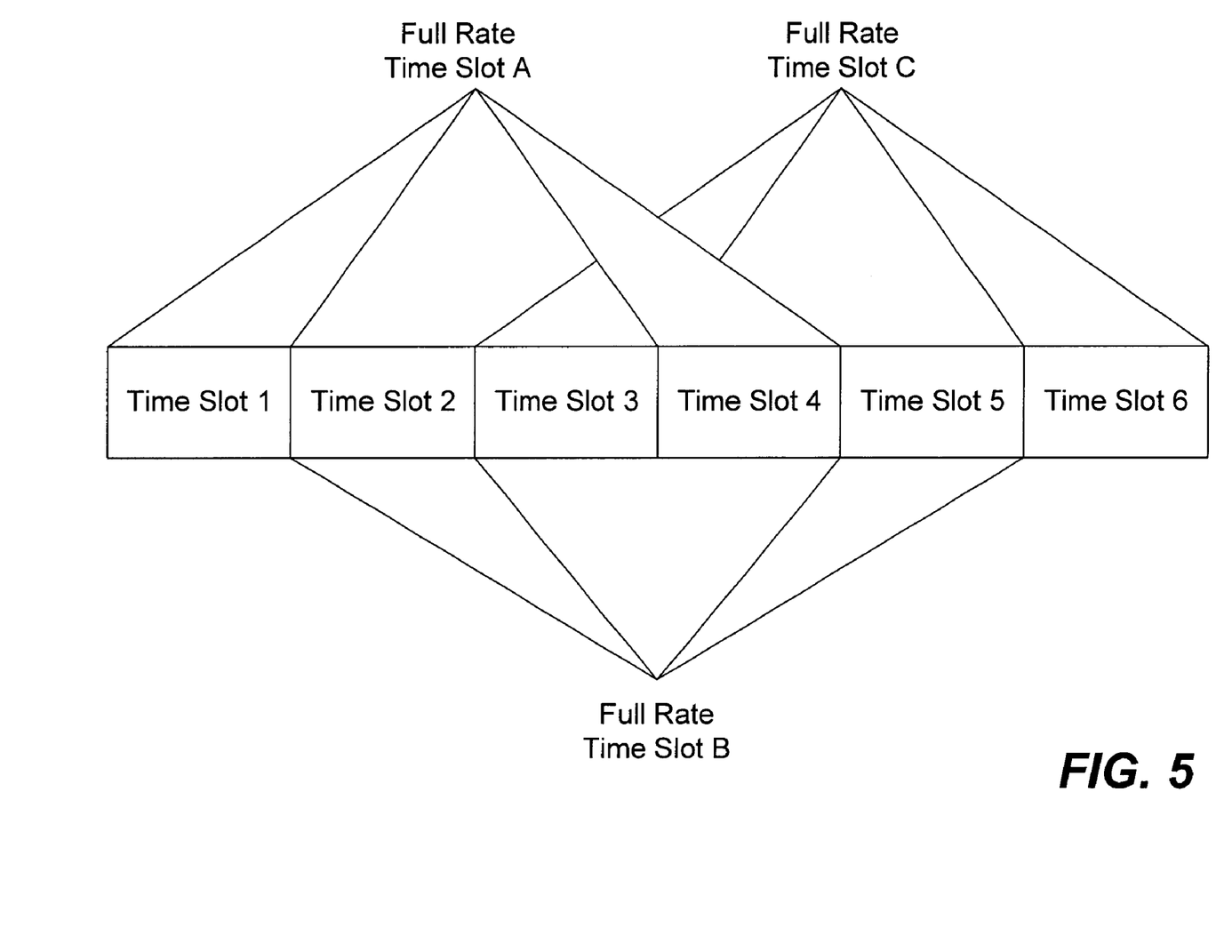
FIG. 5 is a diagram that illustrates time slots in a TDMA frame used by a communication device of FIG. 2 to establish concurrent calls on a single TDMA carrier frequency.

As shown in FIG. 5, a TDMA frame may comprise six TDMA time slots. Because multiple users are multiplexed onto a single TDMA carrier frequency, the base station allocates time slots to communication devices in an orderly fashion such that two communication devices are not assigned the same time slot for transmit or receive operations. Time slots are typically grouped in pairs with one time slot being selected from the first three time slots and another time slot being selected from the second three time slots to form full rate time slots. The base station may allocate these full rate time slots to the communication devices to be used in a call. In the example of FIG. 5, a base station may allocate full rate time slot A to a first communication device, full rate time slot B to a second communication device, and full rate time slot C to a third communication device. If FIG. 5 represents the transmit time slot intervals on a transmit carrier frequency, then the respective communication devices may transmit during their assigned full rate time slot intervals. A similar diagram may be generated for the receive time slot intervals on a receive carrier frequency. The full rate time slot A may, therefore, correspond to time slots 1 and 4 for transmission and time slots 2 and 5 for receive.

In addition to transmitting and receiving information, a communication device may also monitor the signal strength of the setup channels of neighboring cells to identify potential candidates for handoff should the signal strength from the current base station become too weak. This monitoring may take place during time slots designated as mobile assisted handoff (MAHO) intervals. Accordingly, a full rate channel may logically define two TDMA transmit time slots, two TDMA receive time slots, and two TDMA MAHO time slots for use by a single communication device. For example, a first communication device may be assigned full rate time slot A by the base station, which corresponds to transmit time slots 1 and 4, receive time slots 2 and 5, and MAHO time slots 3 and 6. A second communication device may be assigned full rate time slot B by the base station, which corresponds to transmit time slots 2 and 5, receive time slots 3 and 6, and MAHO time slots 1 and 4. Finally, a third communication device may be assigned full rate time slot C by the base station, which corresponds to transmit time slots 3 and 6, receive time slots 1 and 4, and MAHO time slots 2 and 5.

Returning to FIG. 4, at block 124, the controller 42 establishes a first call on the first full rate time slot acquired at block 122. Next, the controller 42 determines the availability (i.e., idle or busy status) of the remaining full rate time slots on the TDMA carrier frequency at block 126. This determination may be made, for example, by monitoring a signal transmitted from the base station that indicates whether one or both of the remaining full rate time slots on the TDMA carrier frequency are idle. Alternatively, the controller 42 may attempt to acquire the remaining full rate time slots and, if a requested full rate time slot is busy, the base station may transmit a busy tone that indicates the requested full rate time slot is busy and that the request is denied. To establish a second, concurrent call, the controller 42 preferably acquires all full rate time slots on the TDMA carrier frequency. This is because the first TDMA receive time slot and the first TDMA transmit time slot are generally offset from each other by a predetermined time interval and it is desirable to avoid an overlap in the transmit and receive time slots for the communication device 40. Future TDMA systems may not have an offset between the first TDMA transmit and receive time slots. Accordingly, it may be sufficient to acquire a single additional full rate time slot on which to establish a second, concurrent call on such TDMA systems.

If one or both of the remaining full rate time slots has been allocated to another user as determined at block 128, then the multi-call program 104 may negotiate with the base station to move the first call to an idle TDMA carrier frequency at block 130. Next, the controller 42 preferably acquires all of the full rate time slots on the TDMA carrier frequency at block 132. At block 134, the controller 42 establishes a second call on a second, full rate time slot, which was acquired at block 132.

The receive control program module 106 and the transmit control program module 108 configure the receive switch 46 and the transmit switch 44, respectively, based on the particular full rate time slots assigned to the two concurrent calls. For example, if the first call is a voice call using a full rate time slot A and the second call is a data call using a full rate time slot B, then the transmit control program 108 places the transmit switch 44 in a first position to connect the DSP 56 to the transmit interface during TDMA transmit time slots associated with full rate time slot A and places the transmit switch 44 in a second position to connect the shift registers 52 to the transmit interface during TDMA transmit time slots associated with full rate time slot B. Similarly, the receive control program 106 places the receive switch 46 in a first position to connect the DSP 76 to the receive interface during TDMA receive time slots associated with full rate time slot A and places the receive switch 46 in a second position to connect the data buffer 74 to the receive interface during TDMA receive time slots associated with full rate time slot B.

The receive control program module 106 and transmit control program module 108 may place the receive switch 46 and the transmit switch 44 in third positions, respectively, that disconnect the voice and data sources/destinations from the controller 42 during the full rate MAHO time slots.

The second call is typically a different type from the first call. That is, if the first call is a voice call, the second call is typically a data call and vice versa. Nevertheless, the two call types may be the same. For example, the transmit switch 44 and the receive switch 46 may connect multiple data and/or multiple voice sources/destinations to the controller 42 such that multiple data or multiple voice calls may be established concurrently. Alternatively, multiple calls may be established between a single data or voice source/destination and multiple parties such that the controller effectively puts all parties on hold except for one party by placing the transmit switch 44 and the receive switch 46 in the third position that disconnects the data or voice source/destination from the controller 42 during TDMA time slots associated with calls to the parties on hold.

Advantageously, the communication device 40, according to the present invention, may allow both a voice and a data call to be maintained concurrently on a TDMA carrier frequency without the need for two separate phones having separate phone numbers and electronic serial numbers. The communication device 40 may provide added convenience through reduced weight and bulk and does not require multiple batteries and battery chargers.

The flowchart of FIG. 4 shows the architecture, functionality, and operation of an exemplary implementation of the communication device 40 software. In this regard, each block may represent a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may be executed substantially concurrently or the blocks may sometimes be executed in the reverse order, depending upon the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A time division multiple access (TDMA) communication device, comprising:

a controller having a transmit interface and a receive interface;

a transmit switch having a first position that connects a voice source to the transmit interface and a second position that connects a data source to the transmit interface; and a receive switch having a first position that connects a voice destination to the receive interface and a second position that connects a data destination to the receive interface;

wherein the controller places the transmit switch in the first position during a TDMA transmit time slot associated with a voice call and in the second position during a TDMA transmit time slot associated with a data call, the voice call TDMA transmit time slot and the data call TDMA transmit time slot being associated with a single TDMA frame, and wherein the controller places the receive switch in the first position during a TDMA receive time slot associated with the voice call and in the second position during a TDMA receive time slot associated with the data call, the voice call TDMA receive time slot and the data call TDMA receive time slot being associated with the single TDMA frame.

2. The communication device of claim 1, wherein the transmit switch includes a third position that disconnects both the voice source and the data source from the transmit interface and wherein the receive switch includes a third position that disconnects both the voice destination and the data destination from the receive interface.

3. The communication device of claim 2, wherein the controller places the transmit switch in the third position during intervals other than the TDMA transmit time slots associated with the voice and data calls, and the controller places the receive switch in the third position during intervals other than the TDMA receive time slots associated with the voice and data calls.

* * * * *